United States Patent Office 3,714,113
Patented Jan. 30, 1973

3,714,113
THERMOSETTABLE RESIN-BASED MOULDABLE FACING COMPOUNDS
Alan Cyril Kingston, Pickering, Ontario, Canada, assignor to The Granure Corporation Limited, Toronto, Ontario, Canada
No Drawing. Filed Dec. 1, 1969, Ser. No. 881,342
Claims priority, application Great Britain, Nov. 29, 1968, 56,774/68
Int. Cl. C08g 51/04
U.S. Cl. 260—40 R                13 Claims

ABSTRACT OF THE DISCLOSURE

A coating composition and its method of application for use on masonry units such as concrete building blocks having improved flame-spread retardance and low smoke production ratings comprising of from 60% to about 90% by weight of a water-insoluble siliceous filler and at least about 5% by weight of a particulate hydrated alumina or aluminum silicate in from about 10% to about 40% by weight of unsaturated polyester resins.

BACKGROUND OF THE INVENTION

The present invention relates to polyester resin-based coating compositions particularly intended for use in forming coatings on building units and more particularly on masonry units such as concrete building blocks. The coating compositions of this invention are characterized by having improved flame-spread retardance ratings and by having unusually low smoke production rates when subjected to elevated temperatures. The invention also embraces novel methods for coating building units as well as novel coated building units. In accordance with a further feature of this invention, there are provided coated building units which have a wide range of decorative surface finishes.

Numerous resin-based compositions and formulations have previously been proposed for coating and moulding applications. Resin-based compositions have been proposed containing numerous types of additives such as pigments, fillers, fire-retardants and ultra-violet light stabilizers for purposes such as strength improvement, shrinkage reduction, reduction of ultra-violet light discolouration, fire-resistance, wear resistance, weather resistance, chemical resistance, and the like.

Many of these previously proposed coating compositions have, however, suffered from disadvantages such as high cost and somewhat restricted effectiveness for the intended purposes. It is, for example, well known to utilize a halogen-containing material and antimony trioxide as fire-resistance additives in resins but, not only are such additives expensive, but they also fall somewhat short of required standards in reducing smoke production in the event of fire. It has also been proposed to utilize magnesium hydroxide as a filler in polymerizable compositions for the purpose of reducing smoke production at elevated temperatures but such use of magnesium hydroxide also is somewhat restricted in practice by the relatively high cost of that material.

There is accordingly a need for a relatively inexpensive, decorative, wear-resistant, chemical-resistant, weather-resistant and durable coating composition which, in addition to having a good flame spread retardance behaviour, would also be characterized by low smoke production at elevated temperatures.

It is accordingly a principal object of this invention to provide a novel coating composition especially suitable for use in coating building units such as concrete blocks and which composition is characterized by providing coatings which in turn are characterized by having a particularly good flame spread retardance and a low smoke production rating.

It is another object of the invention to provide a novel method for coating building units and to provide novel and useful coated building units.

And a further object of the present invention is the provision of novel coating compositions and methods as well as novel coated units, which units can be manufactured with a wide range of surface appearances and textures.

SUMMARY OF THE INVENTION

The present invention is based on the finding that a coating composition can be prepared which has an exceptionally useful combination of properties by the use of a filler composition including a water-insoluble siliceous filler and a particulate hydrated alumina in certain proportions in certain unsaturated polyester resins. It has also been found that useful properties may also be obtained by the alternative use in such siliceous filler compositions of a particulate aluminum silicate.

Before identifying the compositions, methods and coated products of the present invention in greater detail, it should perhaps be explained that the coating compositions of this invention can be used on a wide range of substrates and, merely by way of illustration, there may be mentioned the use of such compositions on concrete blocks, bricks and small wood panels.

The unsaturated polyester resin used in a coating composition of the present invention can broadly be defined as comprising an unsaturated polyester of an unsaturated polycarboxylic acid and a polyhydric alcohol, and at least one unsaturated cross-linking monomer. Typical unsaturated polyesters and cross-linking monomers will be identified in greater detail hereinafter.

The expression "siliceous filler" when used herein is intended to embrace materials containing uncombined silica such as quartz and silica sand, and materials in which $SiO_2$ is present solely or in part in a combined form, for example, naturally occurring and synthetic mineral silicates and silicate/silica mixtures.

A coating composition of this invention is characterized by containing from about 60 to about 90 percent by weight of a filler composition based on the total weight of the resin composition plus the filler composition. The compositions of the invention are further characterized by the inclusion of particulate hydrated alumina, such particulate hydrated alumina being present in such a composition to an extent of at least 5% by weight based on the total weight of the composition, i.e. the total weight of the unsaturated polyester, the cross-linking monomer or monomers and the filler composition (siliceous filler plus hydrated alumina plus any other components of such filler composition). In accordance with another feature of the present invention, the particulate hydrated alumina in the compositions may be replaced by a particulate aluminum silicate.

Accordingly, a coating composition in accordance with the present invention can broadly be defined as comprising from about 10 to about 40% by weight of an unsaturated polyester resin which comprises an unsaturated polyester of an unsaturated polycarboxylic acid and a polyhydric alcohol and at least one unsaturated cross-linking monomer, and from about 60 to about 90% by weight of a filler composition including a water-insoluble siliceous filler and particulate hydrated alumina or particulate aluminum silicate, said particulate hydrated alumina or aluminum silicate being present to an extent of at least about 5% by weight based on the total weight of said coating composition, and said particulate hydrated alumina having a particle size distribution such that a major proportion by weight thereof passes through a #40 U.S.

standard sieve but is retained on a #325 U.S. standard sieve.

Typical unsaturated polycarboxylic acids present in the unsaturated polyesters used in the compositions of the invention are the ethylene dicarboxylic acids (maleic and fumaric acids), aconitic, itaconic, citraconic and chloromaleic acids. If desired, such unsaturated acids can be replaced in part as is conventional, by a saturated polycarboxylic acid such as phthalic acid, isophthalic acid, tetrachlorophthalic acid and adipic acid.

Typical polyhydric alcohols present in the unsaturated polyesters used in the compositions of the invention are ethylene glycol; diethylene glycol; propylene glycol; dipropylene glycol; trimethylene glycol; tetramethylene glycol; pinacol; arabitol; dulcitol; adonitol; mannitol; glycerol; trimethylolpropane; trimethylolethane sorbitol; di-2-propanol; pentaerythritol; dipentaerythritol and other alkane glycols such as butane diol-1,2; butane diol-1,3; butane diol-1,4; pentane diol-1,5; hexane diol-1,6; and isopropylidene bis(p-phenylene oxy)-di-2-propanol.

The unsaturated cross-linking monomers used in the compositions of this invention are the compounds conventionally used for this purpose, for example, styrene; alpha-methyl styrene; 2,3-dimethyl styrene; 2,5-dimethyl styrene; 2,4-dimethyl styrene; alpha-chloro styrene; alpha-ethyl styrene; methyl propyl styrene; p-ethyl styrene; bromo-styrene; dichloro-styrene; isopropenyl toluene; vinyl naphthalenes; the o-, m- and p-chloro- and bromo-styrenes; esters of alpha-methylene carboxylic acids such as methyl acrylate; ethyl acrylate; n-butyl acrylate; iso-butyl acrylate; dodecyl acrylate; 2-chloro-ethyl acrylate; 2-propyl acrylate; 2,2'- dichloroisopropyl acrylate; phenyl acrylate; isohexyl acrylate; methylalpha-chloro-acrylate; methyl methacrylate; ethyl methacrylate; methyl ethacrylate; acrylonitrile; methacrylonitrile; vinyl esters such as vinyl acetate; vinyl propionate; vinyl butyrate; vinyl laurate; vinyl stearate and vinyl chloro-acetate; vinyl ethers such as vinyl methyl ether; vinyl isobutyl ether; vinyl 2-chloro ethyl ether and vinyl stearyl ether; vinyl ketones such as a vinyl methyl ketone; vinyl heptyl ketone and methyl isopropenyl ketone; olefins such as isobutylene; vinylidene halides such as vinylidene chloride and vinylidene fluoride; N-vinyl compounds such as N-vinylpyrrole; N-vinyl carbazole; N-vinyl indole and N-vinyl succinimide; acrylamide, ethacrylamide, N-methylolacrylamide; allyl compounds such as diallyl phthalate; allyl alcohol; allyl acetate; allyl methacrylate; diallyl carbonate; allyl lactate; diallyl malonate; diallyl gluconate; diallyl adipate; diallyl sebacate; diallyl citraconate; the diallyl ester of muconic acid; diallyl itaconate; diallyl chlorophthalate; triallyl citrate; triallyl cyanurate; triallyl phosphate; trimethallyl phosphate and tetraallyl silicate.

Particularly useful compositions in accordance with the present invention have been prepared by the combined use of styrene and methyl methacrylate or styrene and hydroxyethyl methacrylate as the unsaturated cross-linking monomers. It has been found that a further reduction in smoke production at elevated temperatures can be obtained when such particular cross-linking monomer mixtures are used to the extent of from about 65 to about 75% by weight based on the weight of the unsaturated polyester and when the amount of methyl methacrylate or hydroxyethyl methacrylate is from about 10% to about 15% by weight based on the weight of the styrene. Such further improvement in smoke production rating has particularly been obtained with the use of unsaturated polyesters prepared from ethylene glycol and an ethylene dicarboxylic acid (maleic and phthalic acids).

To effect the cross-linking and hardening of the polyester resins in the compositions of the invention at room temperature, it is generally necessary to employ a combination of a free radical catalyst and a promoter. Free radical catalysts for this purpose include conventional organic peroxides, peracids, hydroperoxides and the like, typical compounds being benzoyl peroxide; lauroyl peroxide; t-butyl perbenzoate; 1,1' - hydroperoxydiglycol; hexyl peroxide; methyl ethyl ketone peroxide; t-butyl peroxide; and alpha,alpha-azodiisobutyronitrile. As the promoter compound, one may employ tertiary amines and preferably alkyl-substituted anilines such as dimethylaniline and diethylaniline as well as organic metallic salts such as cobalt naphthenate and cobalt octoate. The amounts of catalyst and promoter which are used can vary quite widely. For example, from about 0.1% to about 5% by weight of each material based on the total weight of the polyester will normally be used. It is, however, preferred to employ from about 0.5% to about 2.5% by weight of the free radical catalyst and a similar amount of the promoter material.

As already indicated, the coating compositions of the present invention broadly constitute from about 10 to about 40% by weight of the unsaturated polyester resin (including the cross-linking monomer or monomers) and from about 60 to about 90% by weight of the filler composition. In many cases, the polyester resin and the filler composition will be used in the relative proportions of from about 30 to about 15% by weight of the former and from about 70 to about 85% by weight of the filler composition. The specific amount of the filler composition which will be used will be determined by such factors as the flow viscosity of the coating composition and such flow viscosity will in turn depend to a large extent on the temperature at which the coating composition is to be used. The particle size distributions and surface areas of the several components of the filler composition will also determine the extent to which the filler composition can be incorporated into the resin. Further understanding of this aspect of the invention will become apparent as the description herein proceeds.

The particulate hydrated alumina which is used in the filler compositions of the coating compositions of the invention usefully has a particle size distribution, as already stated, such that a major proportion by weight thereof passes through a #40 U.S. standard sieve but is retained on a #325 U.S. standard sieve. In general, the particle size distribution of the hydrated alumina will be such that at least about 90% by weight thereof will pass through a #100 U.S. standard sieve and that at least about 80% by weight thereof will be retained on a #325 U.S. standard sieve. In the event that particulate aluminum silicate is used instead of the hydrated alumina, effective results have been obtained by the use of a finely-divided aluminum silicate having a mean particle size of from about 1 to about 10 microns.

In order to obtain the desired flame spread retardancy and limited smoke production for the coatings formed using the coating compositions of the invention, it is considered that the hydrated alumina or the aluminum silicate should be present in the coating compositions to an extent of at least about 5% by weight based on the total weight of the coating composition. In general, the hydrated alumina will be used to an extent of from about 5 to about 25%, preferably to an extent of from about 10 to about 25% by weight based on the total weight of the coating composition.

In accordance with another useful feature of the present invention, the filler composition of the novel coating compositions usefully also includes a particulate and water-insoluble mineral silicate to an extent of at least about 5% by weight based on the total weight of the coating composition. Normally, such mineral silicates are used to an extent of from about 5 to about 10%, preferably from about 6 to about 10%, by weight based on the total weight of the coating composition. Typical mineral silicates for this purpose are particulate feldspar, finely-divided aluminum silicate and finely-divided nepheline syenite. Particularly suitable particulate feldspars for this purpose are those having a particle size distribution such that at least about 75% by weight thereof and preferably at least about 80% by weight thereof will pass through a #40 U.S. standard sieve but be retained on a #200 U.S. standard sieve. In the case of the use of finely-divided nepheline syenite or aluminum silicate as such a mineral silicate, such a material usefully has a mean particle size of from about 1 to about 10 microns.

It is equally within the scope of this invention to utilize various water-insoluble and particulate calcium compounds in the filler compositions of the coating compositions of the invention. For example, in the use of particulate feldspar and finely-divided aluminum silicate as the mineral silicate used together with the hydrated alumina, effective results have been obtained by the additional use of particulate calcium carbonate while, when finely-divided nepheline syenite is used as the mineral silicate, effective results have also been obtained by the use of particulate calcium carbonate, finely-divided anhydrous calcium sulphate and finely divided gypsum (calcium sulphate dihydrate).

Such insoluble calcium compounds will normally be used to an extent of from about 10 to about 30%, preferably to an extent of from about 15 to about 25%, by weight based on the total weight of the coating composition. In the case of calcium carbonate, the particle size distribution is usefully such that at least about 75% and preferably at least about 80% by weight thereof will pass through a #40 U.S. standard sieve but be retained on a #200 U.S. standard sieve. The finely-divided calcium sulphates usefully have mean particle sizes within the range of from about 1 to about 10 microns.

In addition to the aforementioned materials, the filler compositions included in the coating compositions of the invention are usefully essentially completed by silica sand. Such silica sand will normally have a particle size distribution such that at least about 75% by weight thereof will pass through a #30 U.S. standard sieve and that at least about 80% by weight thereof will be retained on a #200 U.S. standard sieve. It will, of course, be understood that relatively small proportions of other materials such as pigments can also be incorporated in such filler compositions.

The coating compositions of the present invention may be prepared from their individual components in any appropriate manner. For example, the polyester including the cross-linking monomer or monomers may first be thoroughly mixed with the selected promoter. The pigment or pigments are then added and thoroughly blended into the mixture. The inorganic dry components of the filler composition are then added and blended into the mixture successively, usefully progressing from those of the smallest particle size to those of the largest. The resulting mixture is continuously agitated in a temperature controlled feed tank held below room temperature. A portion of this mixture, as required for a specific use, is drawn from the feed tank and a suitable catalyst is then thoroughly mixed therewith. The amount of catelyst which is used varies inversely with temperature, for example, 1% catalyst might be used at a temperature of 90° F., whereas 2% might be used at a temperature of 60° F. After incorporation of the catalyst the composition is ready for use.

An alternative method for preparing the coating compositions of this invention is as follows. Half of the polyester including the cross-linking monomer or monomers is first thoroughly mixed with the selected promoter. Half of the filler composition is then added and thoroughly blended into the mixture as described above. The second half of the polyester is then thoroughly mixed with the selected catalyst and the second half of the filler composition in an identical manner. The two resulting blends, on the one hand, the resin-filler-promoter blend and, on the other hand, the resin-filler-catalyst blend are continuously agitated in separate temperature controlled feed tanks maintained below room temperature. Equal portions are drawn from each feed tank as required and thoroughly mixed together to give a combined mixture ready for use.

As already indicated, the present invention also embraces a method of coating. The method according to the invention can broadly be defined as comprising applying to a surface of a building unit a coating composition which comprises from about 10 to about 40% by weight of an unsaturated polyester resin which comprises an unsaturated polyester of an unsaturated polycarboxylic acid and a polyhydric alcohol and at least one unsaturated cross-linking monomer and from about 60 to about 90% by weight of a filler composition including a water-insoluble siliceous filler, particulate hydrated alumina and an operative proportion of a catalyst system for effecting cross-linking of said unsaturated polyester by said unsaturated cross-linking monomer, said particulate hydrated alumina being present in said coating composition to an extent of at least about 5% by weight based on the total weight of said coating composition and having a particle size distribution such that a major proportion by weight thereof passes through a #40 U.S. standard sieve but is retained on a #325 U.S. standard sieve; and maintaining said unit under conditions operative to effect such cross-linking and to bond said coating composition to said building unit.

It will be understood that, when used in this context, the expression "catalyst system" is intended to embrace the catalyst per se and the promoter which is used in conjunction therewith in the manner already described.

The coating compositions of the invention can be applied to building blocks in any appropriate manner but coatings of a particularly uniform thickness can be obtained by disposing a layer of the coating composition in a mould, positioning the building unit in the mould with the surface thereof disposed in contact with the layer of the coating composition, maintaining the building unit within the mould in contact with the layer of the coating composition until cross-linking of the unsaturated polyester of the coating composition has proceeded to an extent sufficient to bond the layer of the coating composition to the surface of the building unit, and removing the building unit from the mould.

If desired, the coating composition can be heated slightly before being placed into the mould, to accelerate the cross-linking process. Such heating will not generally exceed 140° F.

After the compositions have hardened, the mould is removed at which time it will be found that the coating layer has become securely bonded to the base material with which it has been in contact.

In accordance with another useful feature of the method of the present invention, a thin film of a glazing composition is usefully disposed within the mould and allowed to cure at least partially prior to introducing the principal coating composition into the mold. This procedure is particularly advantageous in that the composition of the outer coated surface of the coated unit can be adapted to provide improved hardness and resistance to wear, weather and chemical attack. Although some slight loss of flame-spread retardance and smoke production ratings might result from such use of a separate glazing film, such losses will not generally be significant provided that the thickness of such a glazing film is less than about one hundredth of an inch.

In accordance with still another useful feature of the present invention, a wide range of attractive appearances can be provided for the coated units by disposing a particulate mineral material on the glazing composition film within the mould prior to curing of that film. To obtain optimum bonding between such a glazing film and the principal coating, such particulate mineral material is usefully applied in such an amount as will form a partial or complete monogranular layer. Particularly useful and attractive products have been obtained by the use for this purpose of flint shot having a particle size distribution such that at least about 60% by weight thereof is retained on a #40 U.S. standard sieve.

In addition to the coating compositions and methods of coating hereinbefore identified, the present invention also embraces the novel coated products obtained by the use of the method of the invention.

Other objects, features and advantages of the invention will become apparent as the description herein proceeds.

DESCRIPTION OF THE PREFERRED EMBODIMENTS

The invention will now be described in the following examples which are provided herein merely by way of illustration and in which unless otherwise stated all parts and percentages are by weight.

Example 1

A coating composition was prepared by mixing the following components in a manner yet to be described:

| Component: | Foot-note | Parts | Percent-age |
|---|---|---|---|
| 1 RSM-564A polyester resin | (a) | 240.0 | |
| 2-i Styrene | (a) | 32.0 | |
| and | | | |
| 2-ii Methyl methacrylate | (a) | 48.0 | |
| 3 Resin modifier | (b) | 2.0 | |
| 4 Cobalt naphthenate promoter | (c) | 2.0 | |
| 5 Methyl ethyl ketone peroxide | (d) | 2.0 | |
| 6 Particulate hydrated alumina | (e) | 250.0 | 18.6 |
| 7 Minex 7 | (f) | 100.0 | 7.4 |
| 8 Particulate calcium carbonate | (g) | 250.0 | 18.6 |
| 9 Silica sand | (h) | 400.0 | 29.7 |
| 10 Orange pigment | (h) | 20.0 | 1.5 |
| Total resin components (Nos. 1, 2-i, 2-ii, 3, 4, & 5) | | 326.0 | 24.2 |
| Total filler components (Nos. 6 to 10 incl.) | | 1,020.0 | 75.8 |
| Cross-linking monomer based on polyester | | | 33.3 |
| Methyl methacrylate based on styrene | | | 150.0 | a RSN-564A is a fire-retardant ethylene glycol/maleic acid/phthalic acid polyester resin manufactured and distributed by Canadian Pittsburgh Industries Ltd. It contains approximately 3.5% chlorine and is supplied as a solution in the styrene and methyl methacrylate of components Nos. 2-i and 2-ii. The weight quoted excludes the monomers.

b The resin modifier was "Modaflow" distributed by Monsanto (Canada) Limited. This component is used as a dispersing agent and for controlling foam production during mixing. The use of such a modifier is optional in the coating compositions of this invention.

c The cobalt naphthenate promoter was in the form of a solution of cobalt naphthenate having a concentration of 6% calculated as metallic cobalt.

d The catalyst was used as a 60% solution of methyl ethyl ketone peroxide in dimethyl phthalate.

e The particulate hydrated alumina had the following chemical composition:

| | Percent |
|---|---|
| $Na_2O$ | 0.33 |
| $Fe_2O_3$ | 0.022 |
| $SiO_2$ | 0.016 |
| Free moisture | 0.02 |
| Insoluble | 0.02–0.15 |
| Loss on ignition | 34.5–35.5 |
| $Al_2O_3$ by difference | 64.0–65.0 |

The particulate hydrated alumina had the following particle size distribution (U.S. standard sieves):

| | Percent |
|---|---|
| On #40 | 0–1 |
| Through #40 and on #70 | 1–3 |
| Through #70 and on #100 | 3–6 |
| Through #100 and on #140 | 17–27 |
| Through #140 and on #200 | 30–42 |
| Through #200 and on #325 | 30–40 |
| Through #325 | 5–20 | f Minex 7 is a finely-divided nepheline syenite distributed by Indusmin Ltd. It has the following physical properties:

| | |
|---|---|
| Mean particle size | 4.5 microns. |
| Specific surface area | 1.4 to 1.5 square meters per gram. |
| Particle shape | Nodular. |
| Hardness | 5 to 6 (Mohs scale). |
| Average refractive index | 1.53. | g The particulate calcium carbonate had the following chemical composition:

| | Percent |
|---|---|
| $CaCO_3$ | 96.5 |
| $MgCO_3$ | 2.5 |
| $Al_2O_3$ | 0.25 |
| $Fe_2O_3$ | 0.15 |
| $SiO_2$ | 0.3 |
| MnO | 0.01 |

The particulate calcium carbonate had a particle size distribution such that more than 90% thereof passed through a #40 U.S. standard sieve while less than 10% thereof passed through a #200 U.S. standard sieve.

h The silica sand had the following chemical composition:

| | Percent |
|---|---|
| $SiO_2$ | 99.8 |
| $Fe_2O_3$ | 0.020 |
| $Al_2O_3$ | 0.050 |
| $TiO_2$ | 0.014 |
| CaO | 0.03 |
| MgO | 0.01 |

The silica sand had the following particle size distribution:

| Sieve size: | Percent retained on— |
|---|---|
| 30 | 2 |
| 40 | 32 |
| 50 | 38 |
| 70 | 26 |
| 100 | 0 |

In preparing the mixture, the resin, the monomers, the resin modifier and the promoter (Components Nos. 1 to 4) were first thoroughly mixed together and the pigment, the Minex 7, the calcium carbonate, the hydrated alumina and the silica sand (Components Nos. 5, 7, 8, 6 and 9) were then successively blended into the resin mixture in the order indicated. After such mixing was complete, the catalyst (Component No. 5) was added at a temperature of about 70° F. and the resulting mixture was thoroughly blended.

The resulting mixture was then placed in a vitreous enamel mould and compacted by vibration and shaking to ensure minimum voids and accurate conformance to the mould to provide a layer having a thickness of about 0.125 inch in the base of the mould. A concrete block was then placed on the top of the layer of the coating composition in the mould and pressed downwardly by hand into intimate contact with that layer, the dimensions of the undersurface of the block being approximately 16 inches by 8 inches. The block remained in the mould for about 60 minutes and was then removed. It was found that the block had a cross-linked coating firmly bonded thereto. The coated surface had a glazed orange finish.

The coating was found to exhibit excellent wear-resistance, weather-resistance and good resistance to chemical attack. In practical use, the coating was found to have good flame spread retardance and low smoke production at elevated temperature. For the purpose of providing a basis for comparison with the results reported in the other examples reported herein, the manner in which flame spread retardance and smoke production behaviour were evaluated will now be described.

In the laboratory test, the coated surface of such a concrete block was held so as to face downwardly a distance of 8 inches above the flame orifice of a Bunsen burner adjusted to provide a hot flame with a flame temperature measured at a distance of 5 inches above the burner orifice of 1700±50° F. (prior to positioning the block in the flame). The block was held in the flame for 5 minutes and then removed. While in the flame, the volume of smoke produced was visually observed and, after removal of the block from the flame, the diameter of the burned area of coating was noted.

The flame spread retardance results are classified as follows:

| Diameter of burned area: | Rating |
|---|---|
| 4 inches or less | Good |
| 5 inches | Fair |
| 5½ inches | Moderate |
| 6 inches | Poor |
| More than 6 inches | Bad |

The smoke production results are classified as follows:

| Visual observation: | Rating |
|---|---|
| No visible smoke during test | Excellent |
| Very slight smoke during test | Good |
| Moderate smoke after 3 minutes | Fair |
| Visible smoke from start of test | Poor |
| Heavy smoke throughout test | Bad |

The block coated in the manner already described in this example was rated "good" for flame-spread retardance and "good" for smoke production.

Example 2

A coating composition was prepared in the manner described in Example 1 except that Component No. 6— the particulate hydrated alumina—was omitted and the proportion of silica sand was increased to 650 parts.

Using the same procedures as described in Example 1, the mixed composition was applied to a concrete block and the cured coating so obtained was evaluated for flame spread retardance smoke production. In both these factors, the coating was rated "bad."

Example 3

A coating composition was prepared in exactly the same manner as described in Example 1 but, prior to introducing the coating composition into the mould, a clear gel coat or glazing coat was applied by spraying onto the internal surface of the mould to provide a film having a thickness of about 0.005 inch.

The glazing composition was prepared from the following components:

| Component: | Foot-note | Parts |
|---|---|---|
| 1 14-5139 Apollo Blue Resin | (k) | 520 |
| 2 Styrene | (k) | 280 |
| 3 Finely-divided silica | (m) | 16 |
| 4 Cobalt naphthenate promoter | (c) | 2 |
| 5 Resin modifier | (b) | 8 |
| 6 Internal mould release agent | (n) | 1 |
| 7 Methyl ethyl ketone peroxide | (d) | 16 |

(k) 14-5139 Apollo Blue Resin is an ethylene glycol/maleic acid/iso-phthalic acid polyester distributed by Mia Chemical Co. Ltd., and included ultra-violet light stabilizer UV-24 manufactured by May & Baker Ltd.
(m) The finely-divided silica was Cab-O-Sil manufactured and marketed by Cabot Carbon of Canada Ltd. It has a mean particle size of about 2 microns.
(n) The internal mould release agent was Kantstik 149 manufactured and marketed by Specialty Products Inc. The use of such an agent is optional in the compositions of the invention.

NOTE.—For notes b, c and d, see Example 1.

The components of the glazing composition were mixed thoroughly together prior to application of the resulting composition to the internal surfaces of the mould. The mould was then maintained at a temperature of about 70° F. for about 45 minutes to permit partial curing of the glazing film to take place. A coating composition identical to the composition described in Example 1 was then placed in the mould prior to the positioning therein of a concrete block and curing of the coating in the same manner as described in Example 1.

After the principal coating had cured, it was found that the outer glazing film was firmly bonded to the principal coating which was in turn firmly bonded to the concrete block. The external lustrous appearance of the coated surface was found to have an even greater chemical resistance, wear-resistance and hardness than the coated surface of the block of Example 1.

When tested for flame spread retardance in the manner described in Example 1, the coated surface of the block of the present example was rated "good." Insofar as smoke production was concerned, the coated surface was rated "good" except that a very small amount of smoke was liberated at the commencement of the test during the initial burning of the glazing coating. This additional smoke production is considered to be relatively insignificant provided that the thickness of such a glazing film does not exceed about 0.010 inch.

Example 4

The procedure described in Example 3 was followed in this example except that, after the application of the glazing film to the internal surfaces of the mould, the latter was heated to a temperature of 150±10° F. for a period of about 10 minutes to accelerate the curing of the glazing film. After cooling, the mould was then maintained at ambient temperature for about 5 minutes before the principal coating composition was introduced thereinto.

The properties of the coated block after its removal from the mould were essentially the same as those reported in Example 3.

Example 5

The procedure described in Example 4 was repeated except that the 250.00 parts of particulate calcium carbonate in the principal coating composition were replaced by 250.0 parts of particulate and anhydrous calcium sulphate.

The mean particle size of the calcium sulphate was less than 10 microns.

The final coated block (including an outer glazing coating similar to that described in Example 3) had the same good wear-resistance and weather-resistance as that produced with the calcium carbonate-containing composition of Example 1 and was rated "good" for both flame spread retardance and smoke production when tested in the manner described in Example 1.

Example 6

A first mixture—"Mixture A"—was prepared from the following components in a manner yet to be described:

| Component: | Foot-note | Parts |
|---|---|---|
| 1 RSM-564A polyester resin | (a) | 240.0 |
| 2-i Styrene | (a) | 32.0 |
| 2-ii Methyl methacrylate | (a) | 48.0 |
| 3 Resin modifier | (b) | 2.0 |
| 4 Benzoyl peroxide | | 4.0 |
| 5 Red pigment | | 20.0 |
| 6 Minex 7 | (f) | 100.0 |
| 7 Particulate calcium carbonate | (g) | 250.0 |
| 8 Particulate hydrated alumina | (e) | 250.0 |
| 9 Silica sand | (h) | 400.0 |

NOTE.—For a, b, e, f, g and h, see Example 1:

In preparing the "Mixture A," the polyester in solution, the monomers, the resin modifier and the benzoyl peroxide (Components Nos. 1 to 4) were first thoroughly blended together. The pigment, the nepheline syenite, the calcium carbonate, the hydrated alumina and the silica sand (Components Nos. 5 to 9) were then successively blended into the resin mixture in the order indicated in the foregoing table.

A second mixture—"Mixture B"—was prepared in generally the same manner as the "Mixture A" with the same quantities of the several components except that the benzoyl peroxide catalyst was omitted and 4.0 parts of diethyl aniline were included.

For use, equal quantities of "Mixture A" and "Mixture B" were thoroughly blended together prior to introduction into a mould in the manner described in Example 1. After curing on the surface of a concrete block, the coating composition of the present example was evaluated for flame spread retardance and smoke production as described in Example 1 and was rated "good" on both these factors.

Example 7

The procedure described in Example 6 was repeated except that a glazing coating having the composition of the glazing coating of Example 3 was first introduced into the mould in exactly the same manner as described in Example 3. The provision of such a glazing coat was found to have some beneficial effect on the resistance of the coated block to discolouration on exposure to ultra-violet radiation, and on its weather-resistance, durability, scratch-resistance and resistance to chemical attack.

Example 8

A coating composition was prepared by mixing together the following components in the proportions indicated:

| Component: | Footnote | Parts | Percentage |
|---|---|---|---|
| 1 P4 polyester resin | (q) | 93.6 | |
| 2-i Styrene | (q) | 50.4 | |
| 2-ii Styrene | (q) | 16.0 | |
| 3 Promoter | (r) | 2.5 | |
| 4-i Methyl ethyl ketone peroxide solution | (s) | 1.5 | |
| 4-ii Diallyl phthalate | (s) | 1.5 | |
| 5 Particulate hydrated alumina | (e) | 137.5 | 19.1 |
| 6 Minex 7 | (f) | 55.0 | 7.6 |
| 7 Particulate calcium carbonate | (g) | 137.5 | 19.1 |
| 8 Silica sand | (h) | 220.0 | 30.6 |
| 9 Inorganic pigment | | 3.0 | 0.4 |
| Total resin components (component Nos. 1 to 4) | | 165.5 | 23.2 |
| Total filler components (component Nos. 5 to 9) | | 553.0 | 76.8 |
| Cross-linking monomer (styrene) based on polyester | | | 70.9 | q The P4 polyester resin is an ethylene glycol/maleic acid/phthalic acid polyester (molar ratio 4:1:3) and is manufactured and marketed by B.A.S.F. The polyester is provided as a solution in the monomeric styrene of component No. 2-i, whereas the styrene of component 2-ii is added during the preparation of the coating composition. The amount quoted excludes the styrene monomer.
r The promoter was a mixture of 50% cobalt naphthenate and 50% diethyl aniline.
s The catalyst was a 60% solution of methyl ethyl ketone peroxide in dimethyl phthlate and was diluted with the diallyl phthlate of component No. 4-ii.

NOTE.—For notes b, e, f, g and h, see Example 1.

The coating composition prepared from the above identified components was applied to a concrete block in the same manner as that described in Example 1 and the cured coating was found to be both wear-resistant and weather-resistant. The flame spread retardance and smoke production properties were evaluated in the same manner as that described in Example 1 and the coating was rated as "good" on both these properties.

Example 9

A coating composition was prepared from the components listed in Example 8 in the same relative proportions as in that example except that, instead of the 16 parts of styrene constituting component No. 2-ii, there was used a mixture of 8 parts of styrene and 8 parts of methyl methacrylate.

After compounding, application to a concrete block and evaluation of the coating in the same manner, the rating on the flame spread retardance was maintained as "good" but the smoke production rating was noticeably improved to "excellent."

Similar results were obtained when hydroxyethyl methacrylate was used together with styrene as the unsaturated cross-linking monomer. In the particular use of methyl methacrylate described in this example, the amount of methyl methacrylate expressed as a percentage of the weight of styrene was 13.7%. In general, in such use of methyl methacrylate together with styrene, the amount of methyl methacrylate will, as already indicated, be from about 10 to about 15% by weight based on the weight of the styrene. This further improvement in smoke production rating is obtained when the total amount of cross-linking monomers (styrene plus methyl methacrylate) is within the range of from about 65 to about 75% by weight based on the weight of the polyester. It will be noted that in the present example, this value was 70.9%.

Example 10

A coating composition was prepared and evaluated exactly as described in Example 9 except that the 137.5 parts of particulate hydrated alumina were omitted and the amount of silica sand was increased to 357.5 parts. On evaluation of the cured coating, the flame spread retardance and smoke production ratings were both "bad."

From the results of the present example and from those reported in Example 2, the importance of the hydrated alumina in providing the improved flame spread retardance and smoke production ratings will readily be apparent.

Examples 11–14

Several coating compositions were prepared and evaluated in the manner generally described in Example 8 but using several different materials as replacements for the particulate hydrated alumina for the purpose of further demonstrating the importance of providing this particular component. The various compositions are identified in Table I.

TABLE I

| | Footnotes | Example 11 | | Example 12 | | Example 13 | | Example 14 | |
|---|---|---|---|---|---|---|---|---|---|
| | | Parts | Percent | Parts | Percent | Parts | Percent | Parts | Percent |
| Component: | | | | | | | | | |
| 1 P4 polyester resin | (q) | 93.6 | | 93.6 | | 93.6 | | 93.6 | |
| 2-i Styrene | (q) | 50.4 | | 50.4 | | 50.4 | | 50.4 | |
| 2-ii Styrene | (q) | 8.0 | | 8.0 | | 8.0 | | 8.0 | |
| 2-iii Methyl methacrylate | (t) | 8.0 | | 8.0 | | 8.0 | | 8.0 | |
| 3 Promoter | (r) | 2.5 | | 2.5 | | 2.5 | | 2.5 | |
| 4-i MEK peroxide solution | (s) | 1.5 | | 1.5 | | 1.5 | | 1.5 | |
| 4-ii Diallyl phthalate | (s) | 1.5 | | 1.5 | | 1.5 | | 1.5 | |
| 5a Anhydrous alumina | (u) | 120.0 | 24.9 | | | | | | |
| 5b Particulate feldspar | (v) | | | 137.5 | 22.9 | | | | |
| 5c Hydrated calcium sulphate | (w) | | | | | 120.0 | 18.1 | | |
| 5d Finely-divided aluminum silicate | (x) | | | | | | | 120.0 | 24.9 |
| 6 Minex 7 | (f) | 55.0 | 11.4 | 55.0 | 9.2 | 55.0 | 8.3 | 55.0 | 11.4 |
| 7 Particulate calcium carbonate | (g) | 137.5 | 28.5 | 137.5 | 22.9 | 137.5 | 20.8 | 137.5 | 28.5 |
| 8 Silica sand | (h) | | | 100.0 | 16.7 | 180.0 | 27.2 | | |
| 9 Pigment | | 3.0 | 0.6 | 3.0 | 0.5 | 3.0 | 0.4 | 3.0 | 0.6 |
| Total filler components (Nos. 5 to 9) | | 315.5 | 65.4 | 433.0 | 72.2 | 495.5 | 74.8 | 315.5 | 65.4 | t The methyl methacrylate was added together with styrene of component No. 2-ii in the manner explained in Example 9.
u The anhydrous alumina had a particle size distribution essentially the same as that reported in Example 1 for the hydrated alumina.
v The particulate feldspar had the following chemical composition:

| | Percent |
|---|---|
| SiO₂ (combined) | 62.0 |
| SiO₂ (free) | 1.5 to 2.0 |
| K₂O | 8.7 |
| Na₂O | 5.0 |
| Al₂O₃ | 20–21 |
| CaO | 0.28 |
| MgO | 0.15 |
| H₂O | 0.4 |

The particle size distribution of the particulate feldspar was such that it would pass substantially completely through a #40 U.S. standard sieve and would be substantially completely retained on a # 200 U.S. standard sieve.
w The hydrated calcium sulphate was the dihydrate and had a mean particle size of about 4.5 microns.
x The finely-divided aluminum silicate was a synthetic material having a mean particle size of about 5 microns.

NOTE.—For notes f, g and h, see Example 1; for notes q, r and s, see Example 8.

The flame-spread retardance and smoke production ratings for the coatings of Examples 11, 12 and 13 when evaluated in the manner described in Example 1 were all "bad." Coatings prepared from the composition of Example 14 had flame spread retardance and smoke production ratings of "poor."

It will be seen that, in order to obtain the substantial improvements in the flame spread retardance and smoke production ratings, it is necessary to use the hydrated alumina. In circumstances where the slight improvement which can be obtained by the use of aluminum silicate is sufficient to meet operational requirements, such material may, however, be used instead of the hydrated alumina.

Examples 15 and 16

The coating compositions described in all of Examples 1 to 14 have included nepheline syenite. To illustrate the alternative use of water-insoluble mineral silicates other than nepheline syenite, two coating compositions were prepared in the manner generally described in Example 8 using the components identified in Table II.

TABLE II

| Component: | Footnotes | Example 15 Parts | Example 15 Percent | Example 16 Parts | Example 16 Percent |
|---|---|---|---|---|---|
| 1 P4 polyester resin | (q) | 93.6 | | 93.6 | |
| 2-i Styrene | (q) | 50.4 | | 50.4 | |
| 2-ii Styrene | (q) | 8.0 | | 8.0 | |
| 2-iii Methylmethacrylate | (t) | 8.0 | | 8.0 | |
| 3 Promoter | (r) | 2.5 | | 2.5 | |
| 4-i MEK peroxide solution | (s) | 1.5 | | 1.5 | |
| 4-ii Diallyl phthalate | (s) | 1.5 | | 1.5 | |
| 5 Particulate hydrated alumina | (e) | 137.5 | 19.6 | 137.5 | 22.9 |
| 6a Particulate feldspar | (v) | 55.0 | 7.9 | | |
| 6b Finely-divided aluminum silicate | (x) | | | 55.0 | 9.2 |
| 7 Particulate calcium carbonate | (g) | 137.5 | 19.6 | 137.5 | 22.9 |
| 8 Silica sand | (h) | 200.0 | 28.6 | 100.0 | 16.7 |
| 9 Pigment | | 3.0 | 0.4 | 3.0 | 0.5 |
| Total filler components (Nos. 5 to 9) | | 533.0 | 76.1 | 433.0 | 72.2 |

NOTE.—For e, g and h, see Example 1; for q, r and s, see Example 8; for t, v and x, see Examples 11 to 14.

The coating compositions of Examples 15 and 16 were evaluated in the manner described in Example 1 for flame spread retardance and smoke production. The composition of Example 15 was rated "good" on flame spread retardance and "fair" on smoke production. The coating formed from the composition of Example 16 was rated "good" on flame spread retardance and "excellent" on smoke production. It will thus be seen that the nepheline syenite can effectively be replaced by other mineral silicates.

Examples 17 and 18

These examples describe the use of compositions similar to that of Example 8 but in which the particulate calcium carbonate is replaced by hydrated calcium sulphate and particulate feldspar. The particular compositions are identified in Table III.

The coating compositions were evaluated in the manner described in Example 1. The coating from the composition of Example 17 was rated as "moderate" for flame spread retardance and as "good" for smoke production while the coating from the composition of Example 18 was rated "good" for both flame spread retardance and smoke production.

Example 19

A concrete block was coated by the procedure generally described in Example 3. The composition of the glazing coating was the same as that described in Example 3. After the glazing coating composition had been applied to the internal surfaces of the mould to provide a film having a thickness of about 0.005 inch and prior to curing of that glazing composition, flint shot (particle size distribution such that about 30% by weight thereof was retained on a #30 U.S. standard sieve and about 60% by weight thereof was retained on a #40 U.S. standard sieve) was sprinkled on the glazing film to form a generally monogranular layer thereon within the mould.

After allowing the glazing film to cure partially, the principal coating composition having the composition set down in Example 9 was introduced into the mould. The introduction of the concrete block and the curing of the coating composition were then effected in the manner described in Example 1.

After curing, the coated block showed high ratings for both flame spread retardance and smoke production and, as a result of the provision of the intermediate layer of flint shot, scratching of the surface of the cured glazing film was considerably less noticeable.

By the use of different coloured pigments in the underlying layer of the principal coating composition and by the use of particulate mineral materials having different particle shapes, refractive indices, transparencies and

TABLE III

| Component: | Footnotes | Example 15 Parts | Example 15 Percent | Example 16 Parts | Example 16 Percent |
|---|---|---|---|---|---|
| 1 P4 polyester resin | (q) | 93.6 | | 93.6 | |
| 2-i Styrene | (q) | 50.4 | | 50.4 | |
| 2-ii Styrene | (q) | 8.0 | | 8.0 | |
| 2-iii Methyl methacrylate | (t) | 8.0 | | 8.0 | |
| 3 Promoter | (r) | 2.5 | | 2.5 | |
| 4-i MEK peroxide solution | (s) | 1.5 | | 1.5 | |
| 4-ii Diallyl phthalate | (s) | 1.5 | | 1.5 | |
| 5 Particulate hydrated alumina | (e) | 137.5 | 20.1 | 137.5 | 22.9 |
| 6 Minex 7 | (f) | 55.0 | 8.1 | 55.0 | 9.2 |
| 7a Hydrated calcium sulphate | (w) | 120.0 | 17.6 | | |
| 7b Particulate feldspar | (v) | | | 137.5 | 22.9 |
| 8 Silica sand | (g) | 200.0 | 29.4 | 100.0 | 16.7 |
| 9 Pigment | | 3.0 | 0.4 | 3.0 | 0.5 |
| Total filler components (Nos. 5 to 9) | | 515.5 | 75.6 | 433.0 | 72.2 |

NOTE.—For e, f and h, see Example 1; for q, r and s, see Example 8; for t, v and w, see Examples 11 to 14.

colours, a wide range of different appearances may be provided.

What I claim as new and desire to protect by Letters Patent of the United States is:

1. A coating composition which comprises from about 10 to 40 percent by weight of an unsaturated polyester resin which comprises an unsaturated polyester of an unsaturated polycarboxylic acid and a polyhydric alcohol and at least one unsaturated cross-linking monomer and from about 60 to about 90 percent by weight based on the total weight of said coating composition of a filler composition including (based on the total weight of said coating composition:

from about 5 to about 25 percent by weight of particulate hydrated alumina,
from about 5 to about 10 percent by weight of a particulate and water-insoluble mineral silicate selected from the group consisting of
particulate feldspar, finely divided aluminum silicate and finely divided nepheline syenite, and
from about 10 to about 30 percent by weight of particulate calcium carbonate, the balance of said filler composition consisting essentially of silica sand; in which the particle size distribution of said particulate hydrated alumina is such that at least about 90 percent by weight thereof passes through a No. 100 U.S. standard sieve and that at least about 80 percent by weight thereof is retained on a No. 325 U.S. standard sieve; in which the particle size distribution of said particulate feldspar is such that at least about 75 percent by weight thereof passes through a No. 40 U.S. standard sieve but is retained on a No. 200 U.S. standard sieve; in which said aluminum silicate and nepheline syenite have a mean particle size of from about 1 to about 10 microns; and in which the particle size distribution of said particulate calcium carbonate is such that at least about 75 percent by weight thereof passes through a No. 40 U.S. standard sieve but is retained on a No. 200 U.S. standard sieve.

2. A coating composition as claimed in claim 1 in which filler composition includes (based on the total weight of said coating composition):
from about 10 to about 25 percent by weight of said particulate hydrated alumina,
from about 6 to about 10 percent by weight of said particulate feldspar, and
from about 15 to about 25 percent by weight of said particulate calcium carbonate;
in which the particle size distribution of said particulate feldspar is such that at least about 80 percent by weight thereof passes through a No. 40 U.S. standard sieve but is retained on a No. 200 U.S. standard sieve;
in which the particle size distribution of said particulate calcium carbonate is such that at least about 80 percent by weight thereof passes through a No. 40 U.S. standard sieve but is retained on a No. 200 U.S. standard sieve; and
in which the particle size distribution of said silica sand is such that at least about 75 percent by weight thereof passes through a No. 30 U.S. standard sieve and that at least about 80 percent by weight thereof is retained on a No. 200 U.S. standard sieve.

3. A coating composition as claimed in claim 2 in which said unsaturated polyester comprises an unsaturated polyester of a polyethylene glycol and an ethylene dicarboxylic acid, in which said unsaturated cross-linking monomer is present to the extent of from about 65 to about 75 percent by weight based on the weight of said unsaturated polyester and in which said unsaturated cross-linking monomer comprises a mixture of styrene and from about 10 to about 15 percent by weight of methyl methacrylate based on the weight of said styrene.

4. A coating composition as claimed in claim 1 in which said unsaturated polyester comprises an unsaturated polyester of a polyethylene glycol and an ethylene dicarboxylic acid, in which said unsaturated cross-linking monomer is present to the extent of from about 65 to about 75 percent by weight based on the weight of said unsaturated polyester and in which said unsaturated cross-linking monomer comprises a mixture of styrene and from about 10 to about 15 percent by weight of methyl methacrylate based on the weight of said styrene.

5. A coating composition as claimed in claim 1 in which said particulate and water-insoluble mineral silicate is a finely-divided nepheline syenite and in which said filled composition additionally includes a particulate feldspar.

6. A coating composition as claimed in claim 1
in which said filler composition is present to an extent of from about 70 to about 85 percent by weight based on the total weight of said coating composition;
in which said filler composition includes (based on the total weight of said coating composition):
from about 5 to about 25 percent by weight of said particulate hydrated alumina,
from about 5 to about 10 percent by weight of said finely-divided nepheline syenite, and
from about 10 to about 30 percent by weight of said particulate feldspar, the balance of said filler composition consisting essentially of silica sand;
in which the particle size distribution of said particulate hydated alumina is such that at least about 90 percent by weight thereof passes through a No. 100 U.S. standard sieve and that at least about 80 percent by weight thereof is retained on a No. 325 U.S. standard sieve;
in which said finely-divided nepheline syenite has a mean particle size of from about 1 to about 10 microns; and
in which the particle size distribution of said particulate feldspar is such that at least about 75 percent by weight thereof passes through a No. 40 U.S. standard sieve but is retained on a No. 200 U.S. standard sieve.

7. A coating composition as claimed in claim 6 in which said filler composition includes (based on the total weight of said coating composition):
from about 10 to about 25 percent by weight of said particulate hydrated alumina,
from about 6 to about 10 percent by weight of said finely-divided nepheline syenite, and
from about 15 to about 25 percent by weight of said particulate feldspar,
in which the particle size distribution of said particulate feldspar is such that at least about 80 percent by weight thereof passes through a No. 40 U.S. standard sieve but is retained on a No. 200 U.S. Standard sieve; and
in which the particle size distribution of said silica sand is such that at least about 75 percent by weight thereof passes through a No. 30 U.S. standard sieve and that at least about 80 percent by weight thereof is retained on a No. 200 U.S. standard sieve.

8. A coating composition as claimed in claim 7 in which said unsaturated polyester comprises an unsaturated polyester of a polyethylene glycol and an ethylene dicarboxylic acid, in which said unsaturated cross-linking monomer is present to the extent of from about 65 to about 75 percent by weight based on the weight of said unsaturated polyester and in which said unsaturated cross-linking monomer comprises a mixture of styrene and from about 10 to about 15 percent by weight of methyl methacrylate based on the weight of said styrene.

9. A coating composition as claimed in claim 1 in which said particulate and water-insoluble mineral silicate if a finely divided nepheline syenite and in which said filler composition additionally includes a water-insoluble and particulate calcium compound.

10. A coating composition as claimed in claim 9 in which said water-insoluble and particulate calcium compound is particulate calcium sulphate.

11. A coating composition as claimed in claim 10
in which said filler composition is present to an extent of from about 70 to about 85 percent by weight based on the total weight of said coating composition;
  in which said filler composition includes (based on the total weight of said coating composition):
    from about 5 to about 25 percent by weight of said particulate hydrated alumina,
    from about 5 to about 10 percent by weight of said finely-divided nepheline syenite, and
    from about 10 to about 30 percent by weight of said particulate calcium sulphate, the balance of said filler composition consisting essentially of silica sand;
  in which the particle size distribution of said particulate hydrated alumina is such that at least about 90 percent by weight thereof passes through a No. 100 U.S. standard sieve and that at least about 80 percent by weight thereof is retained on a No. 325 U.S. standard sieve;
  in which said finely-divided nepheline syenite has a mean particle size of from about 1 to about 10 microns; and
  in which said particulate calcium sulphate has a mean particle size of from about 1 to about 10 microns.

12. A coating composition as claimed in claim 11
in which said filler composition includes (based on the total weight of said coating composition):
    from about 10 to about 25 percent by weight of said particulate hydrated alumina,
    from about 6 to about 10 percent by weight of said finely-divided nepheline syenite, and
    from about 15 to about 25 percent by weight of said particulate calcium sulphate;
  in which the particle size distribution of said silica sand is such that at least about 75 percent by weight thereof passes through a No. 30 U.S. standard sieve and that at least about 80 percent by weight thereof is retained on a No. 200 U.S. standard sieve.

13. A coating composition as claimed in claim 12 in which said unsaturated polyester comprises an unsaturated polyester of a polyethylene glycol and an ethylene dicarboxylic acid, in which said unsaturated cross-linking monomer is present to the extent of from about 65 to about 75 percent by weight based on the weight of said unsaturated polyester and in which said unsaturated cross-linking monomer comprises a mixture of styrene and from about 10 to about 15 percent by weight of methyl methacrylate based on the weight of said styrene.

References Cited

UNITED STATES PATENTS

| | | | |
|---|---|---|---|
| 2,751,775 | 6/1956 | Seigonic | 260—40 R X |
| 3,288,615 | 11/1966 | Estes et al. | 260—40 R X |
| 2,972,785 | 2/1961 | Touceda | 260—40 R X |
| 3,078,249 | 2/1963 | Russell | 260—40 R |

OTHER REFERENCES

Modern Plastics, vol. 43 (2) (1956), pp. 154, 156, and 202.

MORRIS LIEBMAN, Primary Examiner

S. M. PERSON, Assistant Examiner

U.S. Cl. X.R.

106—288 B